United States Patent Office 3,536,447
Patented Oct. 27, 1970

3,536,447
METHOD OF PREPARING SYNTHETIC
DIAMOND CRYSTALS
Masao Wakatsuki and Toshio Aoki, Yokohama-shi, and Shinichiro Takasu and Nobuyuki Wakamatu, Tokyo, Japan, assignors to Tokyo Shibaura Electric Co., Ltd., Kawasaki-shi, Japan, a corporation of Japan
Filed Nov. 27, 1967, Ser. No. 685,833
Claims priority, application Japan, Dec. 1, 1966, 41/78,771
Int. Cl. C01b 31/06
U.S. Cl. 23—209.1                            2 Claims

ABSTRACT OF THE DISCLOSURE

Concerning to the synthesis of diamond from carbonaceous materials under an ultra-high pressure at a high temperature, a novel catalyst has been found which consists of an alloy containing silicon and any element of the copper group as its components.

This invention relates to a method of preparing synthetic diamond employing catalysts other than those already known in the usual synthesising method wherein a carbonaceous material is subjected to a reaction pressure of several tens of thousands of atmospheres and a temperature of several thousand degress of centigrade in the presence of a catalyst.

If we would prepare synthetic diamond directly from a raw material of carbon by itself, a pressure of about 130,000 atm. and a temperature of about 4,000° C. should be necessary. There were presented a number of problems in the technique of designing and operating a synthesising device suitable for such severe condition as described above, and these difficult factors caused the diamond synthesis to be impractical. The pressure and temperature practically available in such device are lower than 100,000 atm. and 2,000° C. respectively. In view of these circumstances, there have heretofore been proposed in diamond synthesis many catalysts which could be used with a relatively low pressure and temperature. For example, twelve elements, i.e., iron, nickel, cobalt, platinum, palladium, ruthenium, osmium, iridium, rhodium, chromium, manganese and tantalum, have been known to be effective catalysts for diamond synthesis. Use of these catalysts reduced the reaction pressure and temperature to about 70,000 atm. and 1,800° C. respectively, and enabled reaction to be time completed in about one minute. However, the diamond crystals produced were not satisfactory because of their very small size and abnormal shape.

Afterwards, there have been developed many catalysts which consisted of alloys containing one or more elements selected from the above enumerated twelve elements and other component elements having no catalytic activity by themselves such as aluminium, copper, silver, gold, zinc, molybdenum, tantalum, vanadium, magnesium, tungsten, silicon etc. Use of these improved catalysts reduced the reaction time to about from 2 to 4 minutes, resulting in the slight increase of the size and the improvement of the shape of the crystals produced.

An object of the present invention is to provide a method whereby carbonaceous materials can be converted in the presence of a catalyst to diamonds which have an excellent crystal structure, a proper natural crystal habit, and a uniform and relatively large grain size.

This object has been accomplished by employing, as a catalyst, an alloy or a mixture consisting of metallic silicon or silicon carbide and one or more metals of the copper group as its components, at a pressure of over 40,000 atm. and a temperature of over 1,700° C.

The features of the present invention which are believed to be novel are set forth with particularity in the appended claims. The invention itself, however, as to its organisation together with further objects and advantages thereof, may best be understood by reference to the following description taken in connection with the accompanying drawing, in which:

Figure 1:
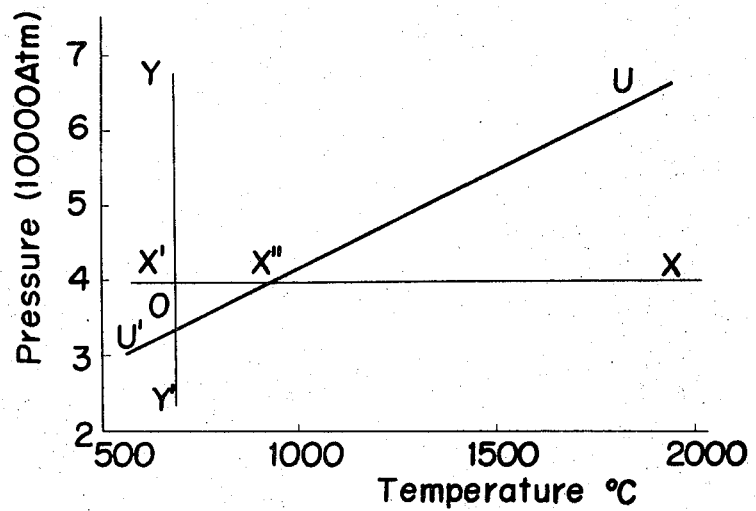
FIG. 1 is a diagram of a diamond-graphite equilibrium line theoretically calculated.

According to the method of this invention, a catalyst is employed which consists of an alloy or a mixture containing metallic silicon or silicon carbide and one or more metals of the copper group consisting of copper, silver and gold. The catalyst may also consist of other alloys or mixtures containing the above mentioned components and additional element which have no catalytic activity by themselves for diamond synthesis. However, chromium, tantalum, manganese, or the metals of Group VIII of the Periodic Table should not be added, since they have catalytic activity by themselves for diamond synthesis, and would cause the quality of the diamond crystals obtained to degrade.

The catalyst of the present invention may be granular or powdery, and furthermore, may be prepared by pre-alloying or simply mixing the component. Some chemical compounds, such as cuprous oxide, silver oxide or gold sulfide, can be employed as the components of copper group. These chemically combined catalytic elements are considered to be reduced to their free molten elemental state when subjected to such a high pressure and high temperature as are involved in diamond synthesis.

When carbonaceous materials are subjected to a pressure of over 40,000 atm. and a temperature of over 700° C. in the presence of the above mentioned catalysts for a suitable time, diamond crystals of good quality and large grain size may be obtained almost regardless of the kind of carbonaceous material used. Of these carbonaceous materials, graphite is the simplest form of elemental carbon, and is the most suitable starting material for diamond synthesis. However, the carbonaceous material may also consist of amorphous carbon, coal, coke, charcoal, sugar charcoal, or other organic substances containing a large number of carbon atoms such as coal tar, pitch, wood, paper, naphthalene, wax or paraffine. Under the condition of the high reaction pressure and temperature, these organic substances liberate free carbon which is believed to be converted into diamond. In addition to these carbonaceous materials, waste fine diamond powder available from synthesized diamond can of course be reused as the raw material alone or in combination with other raw carbonaceous material, so as to be grown into the crystals of a large grain size.

There is practically no limit on the mixing ratio between the carbonaceous raw material and the catalyst, and on the physical form thereof. Regardless of the ratio and the form, the formation and growth of diamond crystals occur surely at the interfaces between the raw material and the catalyst. However, the carbonaceous material in granular form tends to produce diamond crystals of a larger grain size than the one in powdered form.

The reaction time for diamond synthesis in the present invention is longer than that having been previously required because of the use of a special catalyst which consists of two or more component elements, each having no catalytic activity by itself. With known catalysts, the reaction time is only in the range of from 1 to 4 minutes, while the present invention has extended it to the range of from 10 to 20 minutes due to a suitable pressure and temperature. The longer the reaction time, the better growth of excellent diamond crystals can be attained.

The straight line UU' in FIG. 1 indicates a well known diamond-graphite equilibrium line calculated from a theory proposed jointly by R. Berman and Sir Francis Simon (Zeitschrift für Elektrochemie 59, 333, 1955). The region defined by the three crossing straight lines OX, OY and UU' that is, UX"OY region, represents the condition under which diamond crystals may be obtained in accordance with the method of this invention. The line OX indicates a pressure level of 40,000 atm. and the line OY a temperature level of 700° C. These thermodynamic conditions are independent of the type and form of the catalyst to be employed as well as the means of applying pressure and heat. Practically, it is preferable to adapt the conditions of over 50,000 atm. and over 1,200° C.

Although a deailed physical and/or chemical mechanism has not yet been clearly defined with respect to the process whereby the noncatalytic elements used in the method of the present invention, when put together, will jointly develop high catalytic activity so as to form synthetic diamond crystals, it is observed that a catalytic action occurs, as soon as silcon is mixed with, or brought into contact with, a melted phase involving copper, silver or gold. When only copper, silver, gold or a mixture thereof is brought into contact with raw carbon at as high a pressure as 94,000 atm. and as high a temperature as 2,300° C., no diamond formation takes place. Similarly, when only silicon is placed in contact with raw carbon at such high pressure and temperature as above mentioned, no diamond is obtained but silicon carbide is only yielded instead. According to the present invention, a catalytic action for diamond formation develops only through a cooperative work between silicon and one or more elements of the copper group. It is believed that the presence of silicon with elements of the copper group in the synthetic reaction contributes to the development or activation of carbon solubility in copper, silver or gold which is ordinarily nil. On the other hand, silicon metal, which ordinarily has a strong affinity for carbon and makes a stable carbide thereof, is believed to be considerably weakened in its affinity for carbon in the presence of copper, silver or gold, thus inhibiting the occurrence of such carbide and making possible the liberation of free carbon during the synthetic reaction.

Hitherto, the properties of each catalytic element have generally been deemed to originate with its inherent characteristics, so that all of the known and main catalytic elements as previously mentioned are those which individually perform a catalytic action for diamond formation. However, no attention has been given to the development of such catalysts as are formed by a combination of elements, each having no catalytic activity by itself for diamond formation. As already mentioned, the catalysts of this invention are combinations of the elements which have no catalytic activity by themselves, and yet, when put together, will jointly develop high activity for diamond synthesis.

If an element selected from the group consisting of iron, nickel, cobalt, ruthenium, rhodium, palladium, osmium, iridium, platinum, chromium, tantalum and manganese is contained in the catalyst of the present invention as one of its components, the speed of diamond formation will be too much accelerated to obtain crystal products of good quality, because some impurities may be involved in the crystals during their fast growth, and also the crystals tend to have a dendritic configuration. The catalyst in the present invention contains no such active element, thus slowing down the growing speed of crystals, and enabling transparent and colorless or extremely pale colored crystals having a right and regular crystal form to be obtained. This may also be accounted for by the fact that carbon and silicon belong to the same Group IV b of the Periodic Table and have similar chemical natures. Moreover, it is known that the combined structure of carbon and silicon atoms in the crystal of β-type silicon carbide bears a close resemblance to the structure of carbon atoms in the diamond crystal.

Depending on circumstances, however, there are sometimes obtained diamond crystals in which are dissolved several percent of the silicon element in a solid state. Such crystal turns black, and has the same tenacious nature as natural black diamonds, commonly known as carbonado. Unlike the colorless diamond having a somewhat cleaving nature, the black diamond has no such nature. The black diamond is prized for use in cutting tools, but hitherto it has never been synthesised. Although definite and accurate condition has not yet been confirmed for the production of synthetic black diamonds, it is noticed that the black diamond is not easily produced either at a comparatively high temperature such as more than 1,500° C., or in the presence of a catalyst composed of silicon carbide and copper.

It merits special mention that diamond crystals of very good quality which have a tetrahedral form are sometimes found in the crystals synthesised by the method of the present invention. Such tetrahedral crystal is extremely rare in natural diamonds, and has never been synthesised. The tetrahedral diamond is also exceedingly prized for use in cutting tools on account of its excellent tenacity.

For the purpose of carrying out the method of this invention, apparatus of any kind may be employed provided it is capable of producing sufficiently high pressure and temperature. In the examples which follow, there were used synthesising apparatus similar to the one disclosed by H. T. Hall, on pages 125 to 131, the Review of Scientific Instruments, vol. 31, No. 2, 1960, for the reaction vessels shown in FIGS. 2 or 3. Also the apparatus, used in the examples to house the reaction vessel shown in FIGS. 4 and 5 for applying high pressures and high temperatures, consisted of the anbil type disclosed by P. W. Bridgman, on pages 1 to 17, Proceedings of the Royal Society, vol. 203A, 1950.

The operating pressure was calibrated by taking advantage of phase transitions in metals resulting from elevated pressure namely, 26,000 kg./cm.$^2$ and 90,000 kg./cm.$^2$ for bismuth, 38,000 kg./cm.$^2$ for thallium, and 60,000 kg./cm.$^2$ for barium. Temperature was measured first by a thermocouple, and later by heating power. Maximum probable errors in the measurement of pressures and temperatures were considered to be ±5,000 atm. and ±100° C. respectively.

All raw materials for the catalyst preparation in the following examples were as pure as more than 99.8%. Especially, metallic silicon one of the catalyst components, was prepared by pulverising single crystals of the semiconductor grade. The silicon carbide which serves as a catalyst component as well as a source of raw carbon for diamond formation may consist of greenish silicon carbide of α-type or yellowish silicon carbide of β-type. The raw carbon material, used in the following examples was such high purity graphite as the one used in the electrode of a spectroanalysing apparatus. Of course, other kinds of graphite can also be safely used.

The diamond crystals obtained by the method of this invention have a very good appearance and properties. That is to say, highly transparent and colorless crystals can be easily obtained without precise control of pressure and temperature at any optimum values, as far as the pressure and temperature fall in the region indicated before. The present invention also enables diamond crystals to have, as a rule, a relatively uniform grain size of scores of tens micron when the raw carbon material consists of fine graphite powder, and a grain size ranging from 0.2 to 0.4 mm. when massive graphite is used.

With reference to the structure of the crystals formed, a photograph of X-ray diffraction pattern taken of diamonds synthesised by using a nickel catalyst contains some diffraction lines which should not appear in the case of perfect diamond. They are called sotellitic lines or satellites. On the contrary, none of the satellites is observed in the X-ray diffraction photograph of diamond crystals obtained by the method of present invention.

EXAMPLES

The following examples are given by way of illustration and are not intended for purpose of limitation. All parts and percentages are by weight.

Example 1

Figure 2:
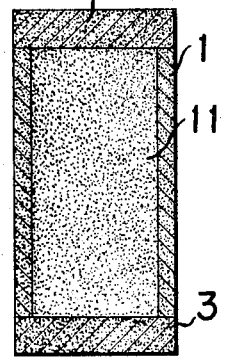
FIG. 2 is an enlarged vertical sectional view of a reaction vessel to be placed in a known synthesising apparatus of high pressure and high temperature, used in the examples of this invention.

A pulverised mixture 11 of 2 parts of yellow silicon carbide, 3 parts of metallic copper and 1 part of graphite was charged into a reaction vessel shown in FIG. 2, which consisted of a cylindrical tube 1 of 3 mm. in inside diameter, 4 mm. in outside diameter and 6 mm. height, and graphite disc lids 2 and 3, each being 4 mm. in diameter and of 1 mm. thick. The vessel itself served as a part of raw carbon material for diamond formation. The vessel was subjected to a pressure of 70,000 atm. and a temperature of 1,700° C. for 15 minutes. The contents were then discharged, and were boiled with concentrated sulfuric acid, nitric acid and hydrofluoric acid respectively. The residue obtained contained about 7 mg. of diamond crystals having grain sizes of from 0.2 to 0.4 mm. The crystals were transparent, colorless or faintly yellowish, and had an almost perfect octahedron.

Example 2

Figure 3:
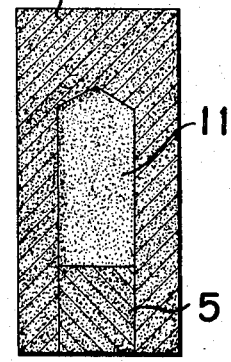
FIG. 3 is another enlarged vertical sectional view of a reaction vessel used in the examples of this invention.

A pulverised mixture of 2 parts of metallic silicon, 4 bide and 3 parts of metallic copper was charged into a reaction vessel shown in FIG. 3, which consisted of a columnar graphite rod 4, of 4 mm. in diameter and 8 mm. high with a hollow, 2.5 mm. in diameter and 6 mm. in depth, sealed at its bottom with a disc lid 5, 2 mm. thick and 2.5 mm. in diameter. The vessel was subjected to a pressure of 70,000 atm. and a temperature of 1,800° C. for 15 minutes, and there were obtained about 4 mg. of transparent and colorless or faintly yellowish diamond crystals having a grain size of from 0.2 to 0.4 mm. and an octahedral form.

Example 3

A pulverised mixture of 2 parts of metallic silicon, 4 parts of metallic copper and 1 part of graphite was charged into a reaction vessel described in Example 1, and was subjected to a pressure of 70,000 atm. at a temperature of 1,600° C. for 10 minutes. There were obtained about 4 mg. of octahedral diamond crystals which were transparent and only slightly yellowish and had grain sizes of from 0.2 to 0.3 mm.

Example 4

The same pulverised and mixed raw materials as in Example 3 were charged into the same reaction vessel as in Example 1, and was subjected to a pressure of 60,000 atm. at a temperature of 1,500° C. for 10 minutes. There were obtained about 1 mg. of octahedral diamond crystals having grain sizes of from 0.03 to 0.2 mm. The crystals were a mixture of faintly yellowish diamond grains and black diamond grains. Referring to the latter black diamond grains, the spectroanalysis and X-ray diffractometry clearly showed that they contained about from 6 to 8 percent of elemental silicon as an impurity dissolved in a solid state.

Example 5

Figure 4:
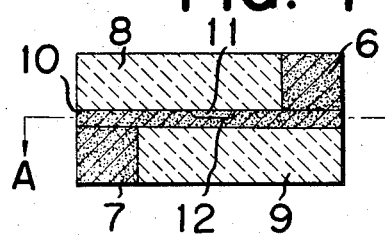
FIG. 4 is another enlarged vertical sectional view of a reaction vessel used in the examples of this invention.
Figure 5:
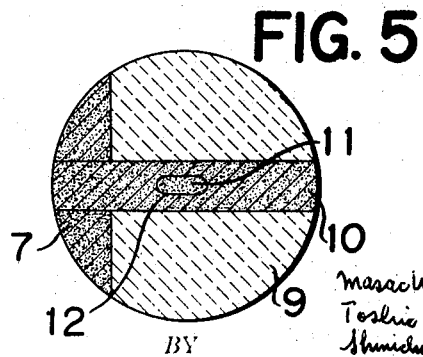
FIG. 5 is a horizontal sectional view of the reaction vessel taken along the line A—A in FIG. 4.

In this example, a reaction vessel such as those shown in FIGS. 4 and 5 was employed. Referring to the figures, the vessel consisted of two pyrophyllite discs 8 and 9 superposed on each other, and a square graphite rod 10 positioned in a groove cut across the center of the interface between said discs 8 and 9, and the rod 10 had a small hollow 12 into which the catalyst 11 was filled. Each of the discs 8 and 9 was 6 mm. in diameter and 1.6 mm. thick, a portion of each disc being comprised of a semicircular graphite plates 6 and 7 to introduce electric current for heating through the rod 10.

A pulverised mixture of 1 part of metallic silicon and 2 parts of metallic copper was charged into the above mentioned reaction vessel, and was subjected to a pressure of 85,000 atm. and a temperature of 2,000° C. for about one minute. Some transparent and octahedral diamond crystals having grain sizes of from 0.1 to 0.4 mm. was recognised in the residue.

Example 6

A pulverised mixture of 2 parts of yellow silicon carbide, 1 part of metallic tin, 4 parts of metallic copper and 2 parts of graphite was charged into a reaction vessel described in Example 1, and was subjected to a pressure of 62,000 atm. and a temperature of 1,500° C. for 20 minutes. There were obtained about 3 mg. of octahedral diamond crystals which were transparent and faintly yellowish green and had grain sizes of from 0.2 to 0.3 mm.

Example 7

A pulverised mixture of 2 parts of metallic silicon, 4 parts of metallic copper and 1 part of graphite was charged into a reaction vessel described in Example 1, and was allowed to stand for two hours at a pressure of 40,000 atm. and a temperature of 900° C. As a result, a number of diamond crystals having grain size of from 0.03 to 0.1 mm. were obtained, and they were found to be a mixture of transparent and faintly yellowish green diamonds and opaque and black ones.

Example 8

A pulverised mixture of 2 parts of yellow silicon carbide, 4 parts of metallic copper, 1 part of metallic aluminium and 2 parts of graphite was charged into a reaction vessel described in Example 1, and was allowed to stand for one hour at a pressure of 50,000 atm. and a temperature of 1,200° C. As a result, about 1 mg. of diamond crystals having grain sizes of from 0.03 to 0.2 mm. were obtained, and they were a mixture of transparent and colorless diamonds and transparent and faintly yellowish diamonds.

Example 9

A pulverised mixture of 1 part of yellow silicon carbide and 3 parts of metallic gold was charged into a reaction vessel described in Example 2, and was subjected to a pressure of 75,000 atm. and a temperature of 1,800° C. for 10 minutes. There were obtained about 2 mg. of octahedral diamond crystals which were transparent and extremely pale yellow, and had grain sizes of from 0.2 to 0.4 mm.

Example 10

A pulverised mixture of 1 part of green silicon carbide and 2 parts of silver was charged into a reaction vessel described in Example 2, and was subjected to a pressure of 75,000 atm. and a temperature of 1,800° C. for 10 minutes. There were obtained about 4 mg. of octahedral diamond crystals which were transparent and extremely pale yellow and had grain sizes of from 0.2 to 0.4 mm.

Example 11

A pulverised mixture of 2 parts of metallic silicon, 6 parts of metallic gold and 1 part of graphite was charged into a reaction vessel described in Example 1, and was allowed to stand for two hours at a pressure of 50,000 atm. and a temperature of 700° C. There were obtained several hundred diamond grains of transparent and pale yellowish green color or of opaque and black color, having grain sizes of from 0.03 to 0.2 mm. X-ray diffractometry showed that all the grains had the almost perfect crystal structure of the regular diamond, and that the black grains contained a solid solution of about 10 percent silicon as an impurity.

While the invention has been described in connection with some preferred embodiments thereof, the invention is not limited thereto and includes any modifications and alternations which fall within the true spirit and scope of the invention as defined in the appended claims.

What is claimed is:

1. In the process of preparing synthetic diamond by subjecting a raw carbonaceous material to an ultra-high pressure and a high temperature in the presence of a catalyst for a time sufficient to produce synthetic diamond, a method of producing synthetic diamonds characterised by using a catalyst which comprises a siliconous component selected from the group consisting of metallic silicon and silicon carbide and another component selected from the group consisting of copper, silver, gold and their mixture, at a pressure of over 40,000 atm. and a temperature of over 700° C.

2. The method of producing synthetic diamonds according to claim 1 wherein the reaction is carried out at a pressure of from 50,000 to 85,000 atm. and a temperature of from 1,200 to 2,000° C. for a length of time of over 10 minutes.

References Cited

UNITED STATES PATENTS

| | | | |
|---|---|---|---|
| 2,947,609 | 8/1960 | Strong | 23—209.1 |
| 2,992,900 | 7/1961 | Bovenkerk | 23—209.1 |
| 3,401,019 | 9/1968 | Cowan et al. | 23—209.1 |

OTHER REFERENCES

Mantell, "Industrial Carbon," 2nd edition, 1946, pp. 10–13.

Bundy, "Diamond Synthesis and the Behavior of Carbon at Very High Temperatures," Annals of the N.Y. Academy of Sciences, vol. 105, art. 17, 1964, pp. 974–976.

EDWARD J. MEROS, Primary Examiner